US007004998B2

(12) United States Patent
Scherrer

(10) Patent No.: US 7,004,998 B2
(45) Date of Patent: Feb. 28, 2006

(54) GAS-LIQUID IMPINGEMENT SEPARATOR INCORPORATED IN A PIPING ELBOW

(75) Inventor: Paul Keith Scherrer, Johnson City, TN (US)

(73) Assignee: Eastman Chemical Company, Kingsport, TN (US)

( * ) Notice: Subject to any disclaimer, the term of this patent is extended or adjusted under 35 U.S.C. 154(b) by 131 days.

(21) Appl. No.: 10/664,528

(22) Filed: Sep. 17, 2003

(65) Prior Publication Data

US 2005/0056150 A1 Mar. 17, 2005

(51) Int. Cl.
*B01D 45/08* (2006.01)

(52) U.S. Cl. .......................................... 95/267; 55/443

(58) Field of Classification Search .................. 95/267; 55/443, 444, 446, 434; 96/188, 189, 190
See application file for complete search history.

(56) References Cited

U.S. PATENT DOCUMENTS 851,494 A * 4/1907 Chalgant .................... 417/156
5,181,943 A 1/1993 Weber
5,510,017 A 4/1996 Abdullayev
5,882,386 A * 3/1999 McAferty et al. ............ 96/378

FOREIGN PATENT DOCUMENTS

DE 3640377 A1 * 6/1988
WO WO 86/01739 3/1986

OTHER PUBLICATIONS

Abstract corr. to WO 86/01739 in English.
Copy of International Search Report.

* cited by examiner

*Primary Examiner*—Robert A. Hopkins
(74) *Attorney, Agent, or Firm*—Bernard J. Graves, Jr.; Dennis V. Carmen

(57) ABSTRACT

A gas liquid separator comprises an elbow into which is inserted a fishbone shaped impingement device comprising downward sloping vanes, the vanes preferably attached to a central spine within the elbow. The vanes may have an opening along the length thereof, and a bottom lip to channel accumulated liquid to one or more collection points, preferably the elbow internal wall. The device is robust, of simple construction, and exhibits relatively low pressure drop.

43 Claims, 7 Drawing Sheets

GAS-LIQUID IMPINGEMENT SEPARATOR INCORPORATED IN A PIPING ELBOW

BACKGROUND OF THE INVENTION

1. Field of the Invention

The present invention is directed to separation of liquid droplets from gas-liquid streams in chemical processes.

2. Background Art

Many chemical processes require take-off of a gas phase from chemical processing equipment such as chemical reactors. In some cases, the nature of the various reactants, products, and byproducts facilitate removal of a gas phase substantially free of liquid. However, in other processes, considerable quantities of liquid droplets may be associated with the gas phase, and in the case where the liquid droplets can later solidify, whether due strictly to a phase change or to subsequent reaction, lines and valves may be plugged and require disassembly and cleaning or replacement. Furthermore, in many cases, the liquid droplets may constitute a loss of valuable reactants, intermediate products, or end products. For example, during preparation of polyethylene terephthalate polymers, polymer and oligomer particles may carry over with ethylene glycol and water as the latter are removed from the reactor in a vapor phase.

Many types of devices for liquid removal from gas streams are known, including cyclone separators, chill plates, filters, and the like. Packed columns efficiently remove liquid droplets, for example. However, many of these methods, for instance chill plates, are energy intensive, and others such as packed columns exhibit a severe pressure drop as well as being prone to plugging. In-line filters also suffer from these drawbacks.

Inertial separators or traps make use of the fact that a flowing gas can easily make turns that droplets with large inertia cannot. The droplets that cannot turn with the gas stream because of their inertia strike or impact a target or collecting surface, onto which they are deposited. A simple pipe elbow is an example of such a separator. However, such separators are generally efficient only for droplets of materials with large inertia. Since the inertia of the droplets is measured by its mass, the size and density of the droplets is important in determining the removal efficiency.

In U.S. Pat. No. 5,181,943, liquid removal is effectuated by providing a large number of plate-type baffles across the path of a liquid-gas stream, the baffles being substantially parallel but downward sloping, and alternately extending from opposite sides of the separation device, positioned transverse to the initial direction of flow. This device creates a high surface area serpentine path, and must be quite large if pressure drop is to be low. Since in many cases the separator must be maintained at a specific operating temperature and thus requires considerable external insulation, such devices are relatively capital intensive.

U.S. Pat. No. 5,510,017 discloses a gas-liquid separator involving two sets of concentric, radially arranged vanes, which cause a swirling flow of liquid-containing gas directed therethrough. The centrifugal forces generated cause liquid droplets to impinge upon the walls of the pipe section containing the separator, from which they are removed as bulk liquid by a series of drains. This device is of rather complex construction, and is believed to be useable only when configured for horizontal flow due to the placement of liquid-trapping baffles and drains. Moreover, conversion of linear flow to a swirling flow necessarily requires energy, which is manifested as a pressure drop.

EP 0 197,060 discloses a gas liquid separator useful in gas desulfurizing, which employs a plurality of groups of obliquely mounted large surface area slats which are sprayed with a rinsing liquid to carry away droplets impinging upon the slats. Use of a rinsing liquid is undesirable in many applications.

It would be desirable to provide a gas-liquid separator of simple design and construction, which can be used without rinse liquid, which offers low pressure drop, and which is efficient at separating droplets with relatively small inertia.

SUMMARY OF THE INVENTION

The inventor discovered that the efficiency of an elbow-type inertial separator can be markedly increased by positioning a plurality of vane-like target surfaces within the elbow. Due to the shape of the collecting surfaces and their preferred supporting structure, the addition to the elbow is referred to as a fishbone impingement device. Separation efficiency is high, even for droplets with small inertia. The device is robust, of simple construction, and cost effective.

DETAILED DESCRIPTION OF THE PREFERRED EMBODIMENT(S)

The separators of the present invention include a "fishbone" as hereafter defined, positioned within a pipe elbow. A single fishbone may be employed, or a plurality of fishbone devices may be employed. Preferably, one fishbone is employed per elbow.

Figure 1:
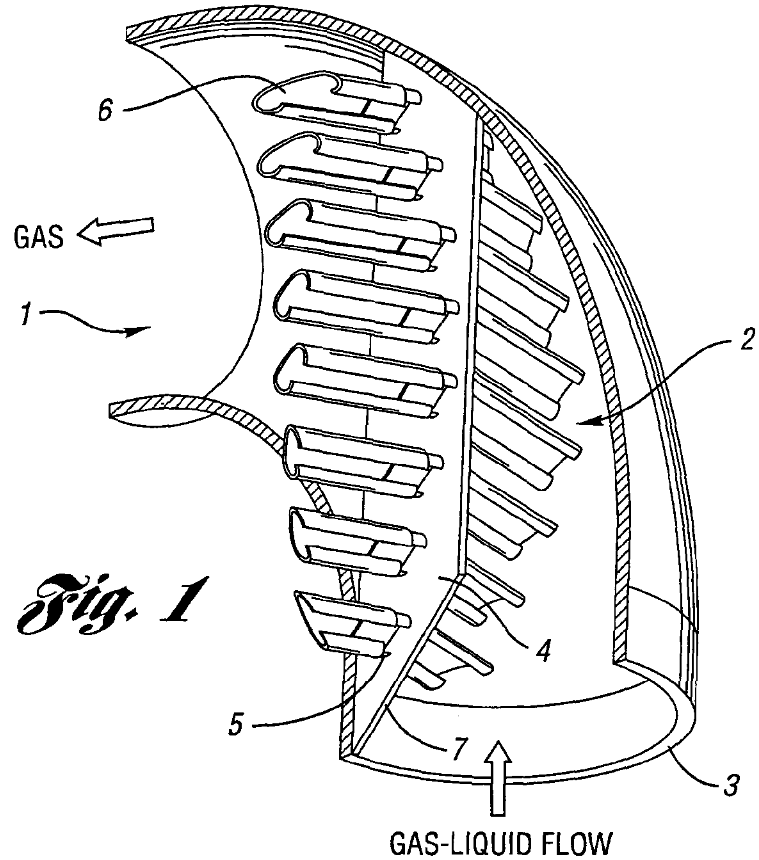
FIG. 1 illustrates one embodiment of an inertial gas liquid separator of the present invention, in cutaway view.

A preferred embodiment of a fishbone may be best described by reference to FIG. 1, a cut-away view of an elbow containing a fishbone. The gas-liquid separator 1 comprises pipe elbow 3 and fishbone 2. The fishbone 2 is comprised of spine 4, to which are attached, e.g. by means of bolting, welding, etc., struts 5, which are directed angularly downward in their longitudinal direction with respect to gravity, and preferably angled obliquely cross-sectionally with respect to the direction of gas flow. Mounted on struts 5 are vanes 6, which in this embodiment, are hollow partially flattened tubes, having an opening in one side thereof facing the flow of gas and liquid. In the embodiment shown, the vanes are a sliding fit onto the struts, to provide for length adjustment away from the spine 4. However, the vanes, once positioned appropriately, are generally permanently affixed to the struts, e.g. by spot welding, or the strut may be dispensed with and the vanes affixed directly to the spine. The vanes extend close to the interior walls of the elbow, and may be attached thereto if desired. Preferably, the vanes reach to within 0.1 to 5 mm of the elbow interior wall, more preferably 1–2 mm. Proximity to the elbow walls depends, however, on the elbow diameter, method of drainage, and concerns related to thermal stresses as a result of the thermal expansion of the vanes, and does not otherwise impose any limitation on the structure of the separation device. For example, it is possible to space the ends of the vanes more distantly from the elbow walls, particularly in the case of large elbows with diameters of, for example, 0.75 to 3 meters, or to touch the walls or even be affixed thereto.

In operation, liquid droplets impinge both on the walls of the elbow and upon the spine, struts, and vanes. As the vanes are directed angularly downwards with respect to gravity, accumulated liquid runs down the vane, particularly in a bottom lip which extends the length of the vane and defines the opening therein, when present, and is then also deposited on the elbow walls.

Figure 11:
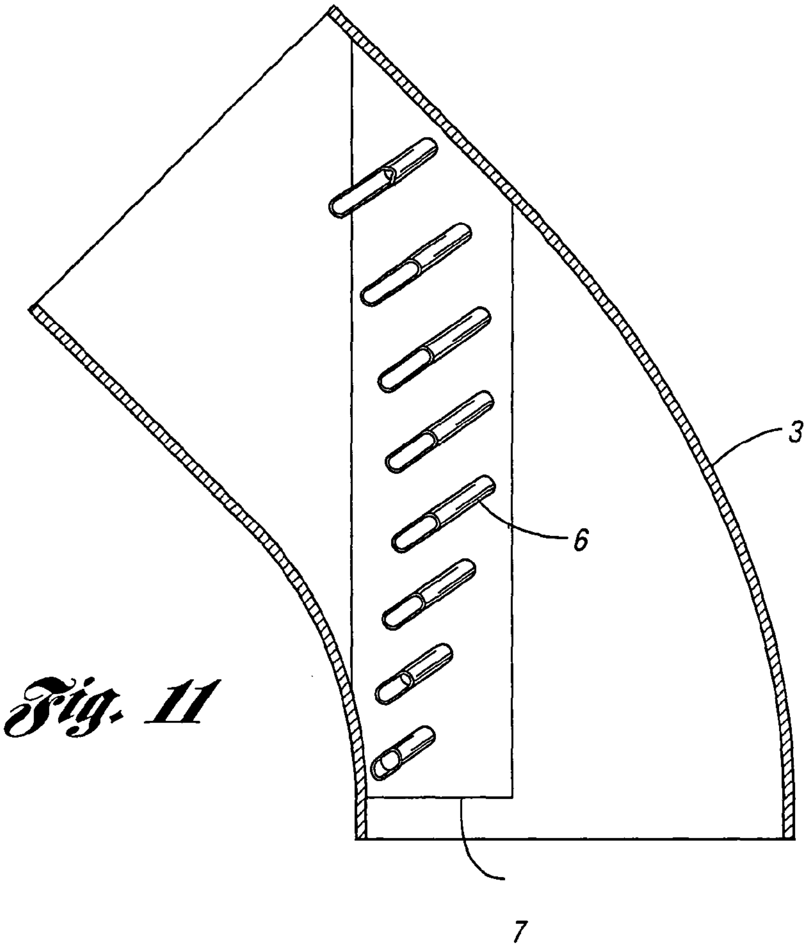
FIG. 11 illustrates a 45° elbow with fishbone separator from the side.

The spine may be positioned in the elbow in any manner, but is preferably substantially vertical. It is preferable, as shown in FIG. 11, that the spine have a width which is less than the diameter of the elbow, preferably about 25–70 percent, more preferably 30–50 percent of the elbow diameter, and preferably but not necessarily, be oriented radially inwards from the elbow walls, this radially inwards direction corresponding with a plane through the bend of the elbow, when a normal 45° or 90° elbow is involved.

However, the spine may also be mounted off center, and/or at an angle to the vertical. Moreover, the spine itself need not be planar, but may be twisted in helical fashion, bent in a curve, etc. In the most preferred designs, the major function of the spines is holding and positioning the vanes, and thus any size or geometric spine arrangement which satisfies this goal will be suitable. The spine may be a simple rod or tube to which the vanes, with or without struts, are attached. Moreover, in embodiments where the vanes are connected directly or by intermediate struts to the walls, the spine becomes unnecessary and may be dispensed with.

Figure 2:
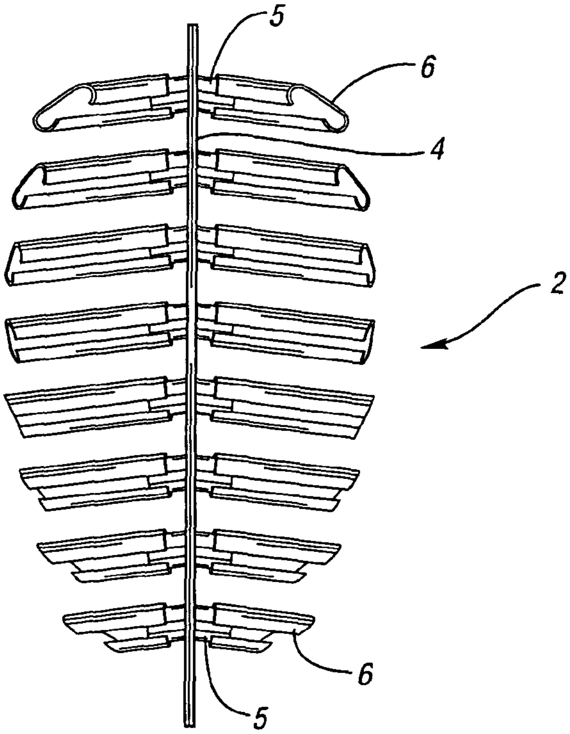
FIG. 2 illustrates a head on view of one embodiment of the fishbone insert of the subject invention inertial gas liquid separator.

FIG. 2 illustrates a preferred embodiment of the fishbone 2, viewed from the side. The downward direction of the struts 5 and vanes 6 may be seen, as may also their oblique orientation with respect to flow. Note that the ends of the vanes are angled and or contoured such that a close approach to the walls of the elbow can be achieved. The actual angles/contours can be readily determined by conventional CAD techniques.

Figure 3:
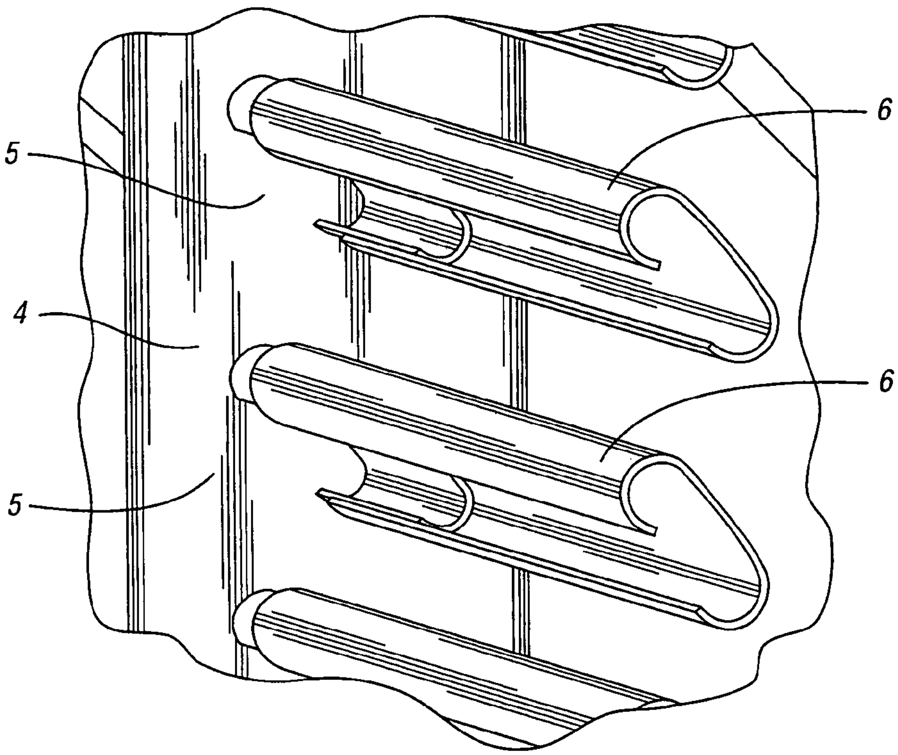
FIG. 3 illustrates an enlarged view of one embodiment of vanes and struts where the vanes slope downward toward the walls of the elbow.

FIG. 3 shows an enlarged view of the struts and vanes, showing one preferred embodiment of their mounting.

Figure 4:
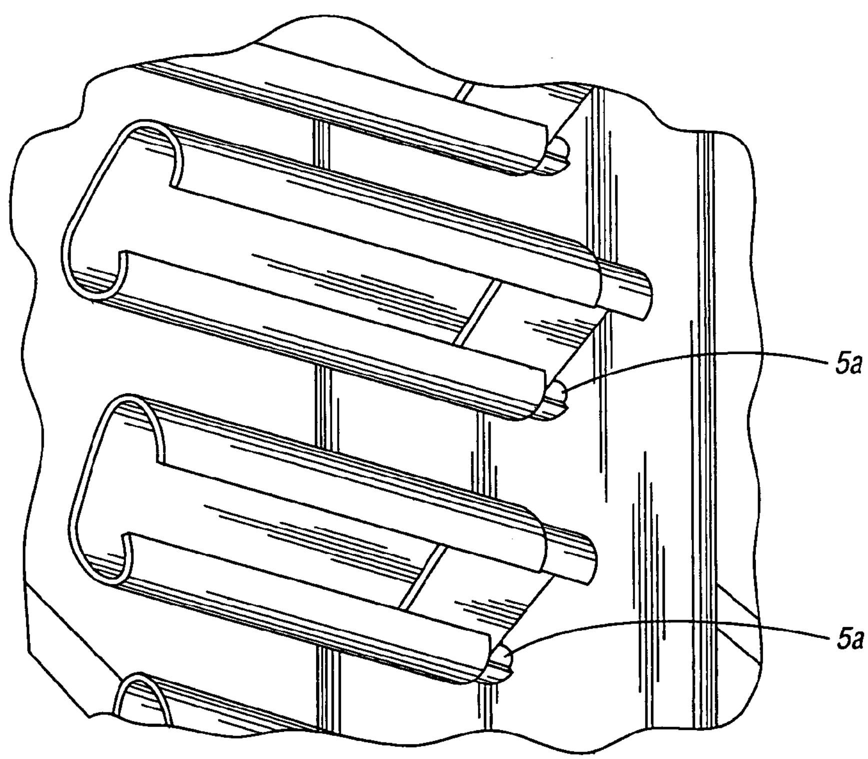
FIG. 4 illustrates an embodiment where the vanes slope downwardly toward the center and a central collection site rather than toward the walls of the elbow.

FIG. 4 illustrates an alternative embodiment where the vanes and struts, rather than angling down towards the walls of the elbow, angle downwards towards the spine, which in this case is hollow. At the intersection of the strut with the spine, a hole 5*a* in the spine allows accumulated fluid to flow into the hollow spine, from which it drains out the bottom. This hole may also advantageously be elongated such that it extends below a substantial portion of the strut and or vane, to catch liquid from other portions of the strut or vane. The hole may also be configured with an extruding bottom lip to augment capture of liquid. A bottom drain can also be configured to pierce the wall of the elbow, allowing fluid to be directed other than back to the process vessel. The spine may also be extended downwards from the elbow, i.e. into the reactor if the elbow is connected directly to the reactor, to allow fluid to be returned where gas velocity in the reactor is lower, thus having less tendency to be swept back into the elbow by high volume gas flow. These embodiments (central drain) are not presently preferred.

The struts, when used, are generally adapted in shape to accommodate the mounting of the vanes, for example by a sliding fit or by a "spring" fit, but bolts, welding, etc., may also be used. Spot welding, for example, may be used to prevent vibration from dislodging the vanes, although the proximity of the vane ends to the elbow walls will generally prevent the vanes from extending outwards such that they may become detached from the struts. The struts, spine, vanes, and any other parts may be constructed of any desired metal, generally stainless steel, but, where warranted by the nature of the chemicals to which these parts may exposed, may be constructed of titanium, carbon steel, etc. With the proper environment, even plastic construction may be used.

Figure 5A:
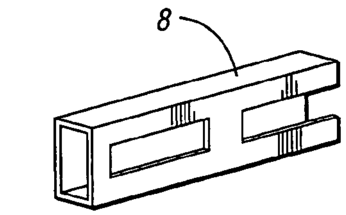
FIG. 5*a*–5*e* illustrate some alternative embodiments of the fishbone insert of the subject invention.
Figure 5B:
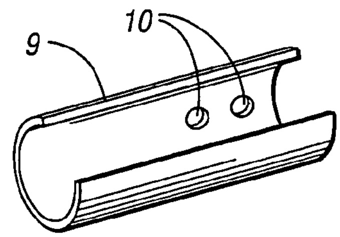
Figure 5C:
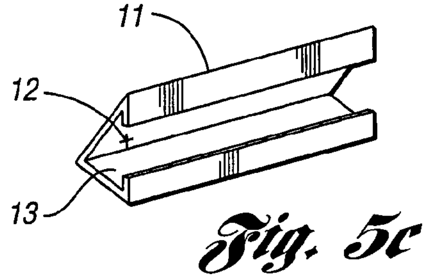
Figure 5D:
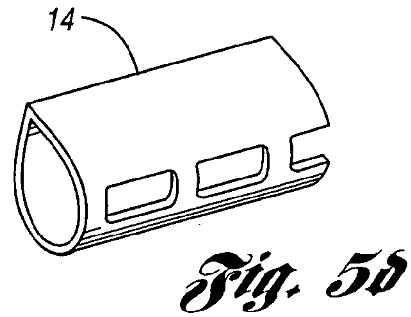
Figure 5E:
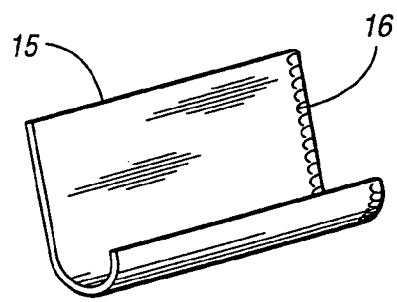

The vanes preferably are constructed "hollow," with a longitudinal slit, e.g. having a "C" or "J" cross-section, and are of a cross-section such that when in position in the fishbone, a bottom channel is preferably present, to aid in conducting liquid along the vane, and to shield collected liquid from the gas flow, so that liquid does not reenter the gas stream. Circular, elliptical, air-foil, square, rectangular, or other shapes may be used. The shape and oblique angle with respect to gas flow may be calculated by aerodynamic simulations to minimize pressure drop, and/or to maximize fluid collection efficiency. FIGS. 5*a*–5*e* illustrate some possible vane shapes. In FIG. 5*a*, a rectangular vane 8 is shown, with discontinuous openings. In FIG. 5*b*, an open "semi-circular" vane 9 is depicted, with two holes 10 for mounting by bolts to a strut. FIG. 5*c* illustrates a triangular vane with a completely open portion 12 along its length, and a liquid collecting lip 13. FIG. 5*d* shows an airfoil vane 14 with discontinuous opening, while FIG. 5*e* shows a vane 15 having no top lip, which is configured to be welded directly to a spine along weld lines 16.

The oblique angle the vanes make with fluid flow may be constant, or may change from bottom to top of the spine. The angle is preferably such that for vanes having an aspect ratio (height/thickness) significantly greater than 1, e.g. 2 to 10, preferably, 3 to 6, the broad side is transverse to the direction of flow. Thus, preferably, the vanes are located in a plane which is orthogonal to the flow direction at the position of the vane. The angle of the vanes ($\theta$ in FIG. 8), with respect to the flow direction, is preferably from 20° to 90°, more preferably 45° to 90°, and most preferably 60° to 90°. The downward slope is preferably from 5° to 40°, more preferably 5° to 30°. The slope is dependent on the viscosity of the droplets that are captured, the rate at which droplets are captured, and the dimensions of the channel, and can be adjusted accordingly.

If one were to "look" through the elbow along the direction of gas flow, one would "see" a complete wall of vanes with little or no space therebetween, or with the vanes actually somewhat overlapping. Of course, since the vanes are not actually touching, but are staggered in space, pressure drop is low, while liquid droplets will have a tendency, due to their inertia, to impinge upon the vanes and be collected thereby, as opposed to flowing around the vanes.

The term "across the flow" means that the vanes are oriented lengthwise in a direction other than the flow direction. The vanes are not arranged radially about a single axis across a limited portion of the elbow as disclosed in the straight separators of U.S. Pat. No. 5,510,017, but are positioned sequentially along a considerable length of the elbow, as shown in the figures. Thus, the vanes are not positioned with the objective to impart an intense swirling flow as described in U.S. Pat. No. 5,510,017.

The spine may be a simple plate to which the struts or vanes are attached by suitable methods, or may be a tube or other geometric shape. Since the flat spines shown in the Figures facilitate mounting in the elbow and present significant droplet-collecting surface area themselves, these are presently preferred. While flat spines are also preferred for ease of design and construction, twisted (helical) spines are also possible. The spine, when planar and vertically oriented, is positioned as previously described. The spine aids somewhat in collection efficiency, but primarily serves as a convenient attachment point for the vanes and/or struts, facilitating ease of construction.

Figure 9:
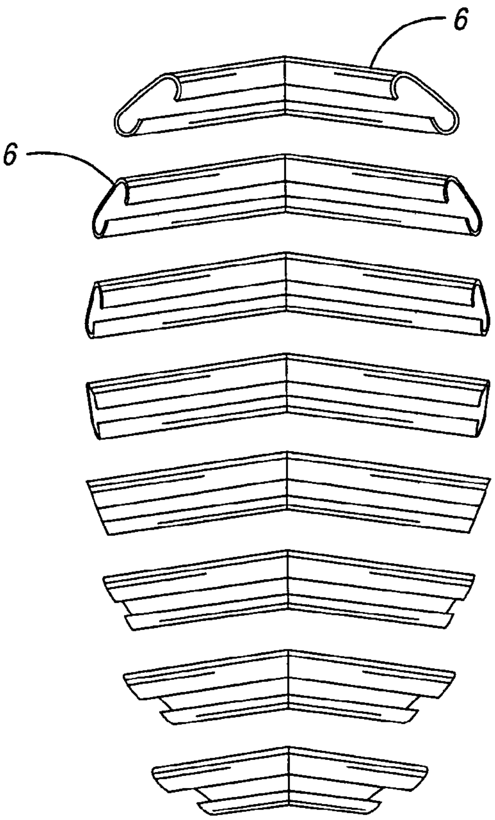
FIG. 9 illustrates a spineless fishbone separator of the present invention.

The fishbone separator may also be configured without a spine, however, as shown in FIG. 9. In this case, the vanes will be attached to at least one wall of the elbow, for example by welding, or to struts attached to the wall. The vanes may assume an angled shape, as shown in FIG. 9, or may be straight. Straight vanes will be directed downward towards a wall of the elbow, while angular vanes may be directed downwards at both ends, in either case to facilitate collected liquid to run along or within the vanes and be deposited on the elbow walls.

Figure 12:
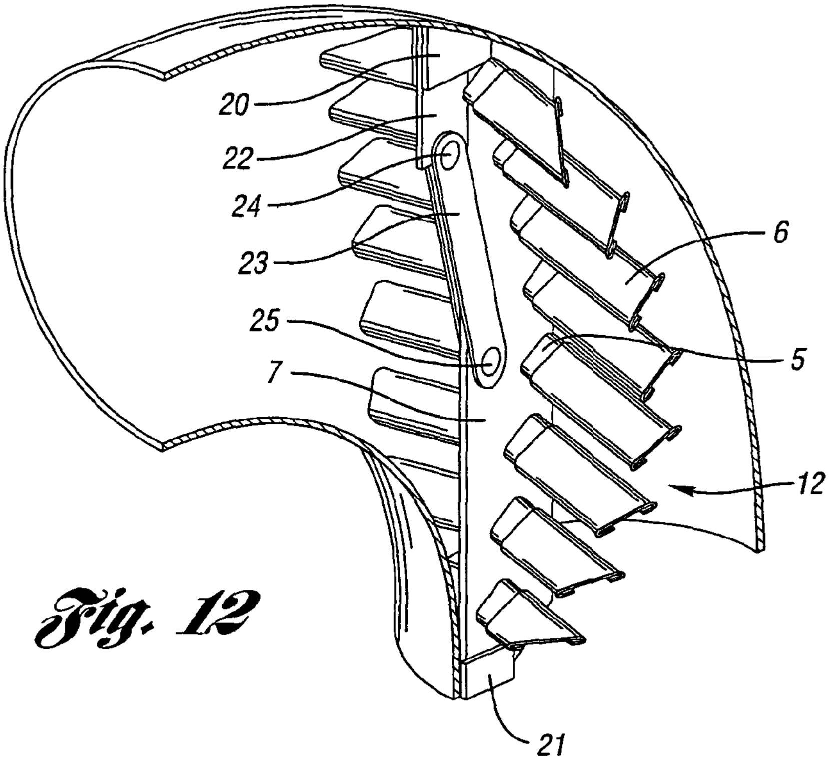
FIG. 12 illustrates one preferred mounting method for fishbone separators.

FIG. 12 illustrates an alternative mounting method which is preferable in large elbows, where dimensional changes in the elbow and/or fishbone may be expected due to changes in pressure and temperature under operation, or between operation and shut-down. In FIG. 12, the fishbone 2 consists of struts 5, vanes 6, and spine 7 as previously disclosed.

In this embodiment, the spine is not attached to the elbow per se at either end. Rather, two retainers, an upper retainer 20 and a lower retainer 21 are affixed to the elbow walls. The retainers contain a slot which receives the spine. In the lower retainer 21, the spine may simply be inserted into the slot, or may be secured loosely with a cotter pin, bolt, or the like. Similarly, the upper portion of the spine fits within a slot in the upper retainer 20. The upper retainer has an protrusion 22 extending downwards into the elbow, to which spine mounting link 23 is rotatably attached, again by a cotter pin, bolt, etc. 24 the lower end of the link similarly attached to the spine by cotter pin, bolt, etc. 25. The term "link" includes a unitary link or a link comprised of a multiplicity of elements, so long as the link maintains the general location of the top end of the spine while allowing relative movement between the spine and the walls of the elbow.

The spine is configured to be the same length or somewhat shorter in length than the minimum dimension of the elbow, i.e. at lower temperatures and pressures. As the elbow expands, the link maintains position in the elbow, but the spine does not restrict elbow wall movement. Thus, less stress is placed on all components. The type of mounting described above is termed herein a "floating positioning" mounting, and is characterized by the ability of the separator to maintain its general location in the elbow while allowing relative movement between the separator and the elbow due to differential expansion and the like.

Figure 10:
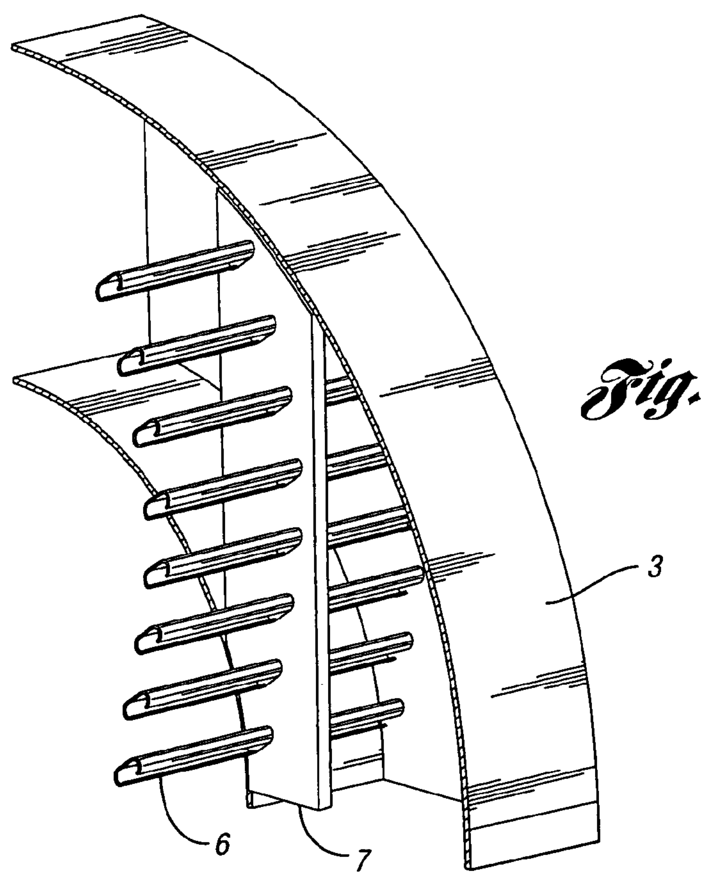
FIG. 10 illustrates a fishbone separator positioned in a square elbow.

The elbow itself need not be of circular cross section, but may be of any desired shape, e.g. elliptical, polygonal, etc. "Square" or "rectangular" elbows can easily be fabricated, for example. A fishbone separator in a rectangular elbow is shown in FIG. 10. The elbow may be a 90° elbow or one of greater or lesser angle, i.e. 30° to 180°, preferably 45° to 90°. Multiple elbows may be mitered together as required.

Figure 6:
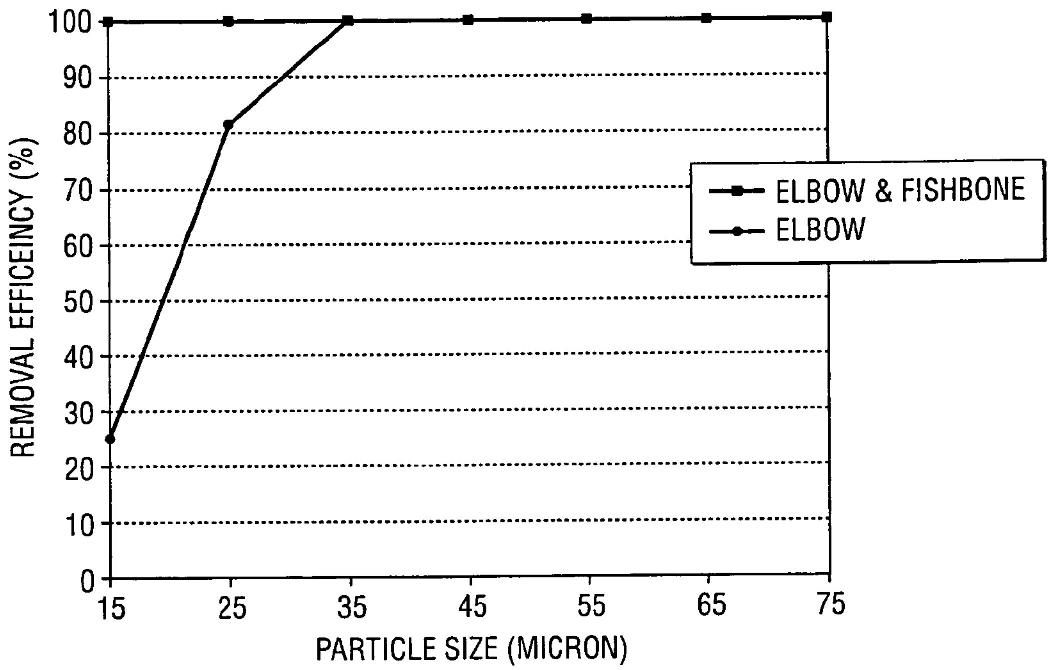
FIG. 6 illustrates separation efficiency of the subject invention separators as compared to a simple elbow separator, with varying particle size of constant density.

Collection efficiency was examined using conventional computational fluid dynamics. In FIG. 6, a comparison of separation efficiency of the fishbone separator of FIG. 1 with that of a simple elbow is made, with the assumption that particles of varying size all have the same density. As indicated previously, separation efficiency generally is related to the inertia of the droplets. Small droplets, of course, have correspondingly less inertia. As shown in FIG. 6, the simple elbow is efficient for particles above 35 μm, below which the efficiency rapidly falls, such that at a droplet size of 15 μm, only ca. 25% of droplets are separated. However, the subject invention separator is virtually 100% efficient even with 15 μm particles for the assumed droplet density.

Figure 7:
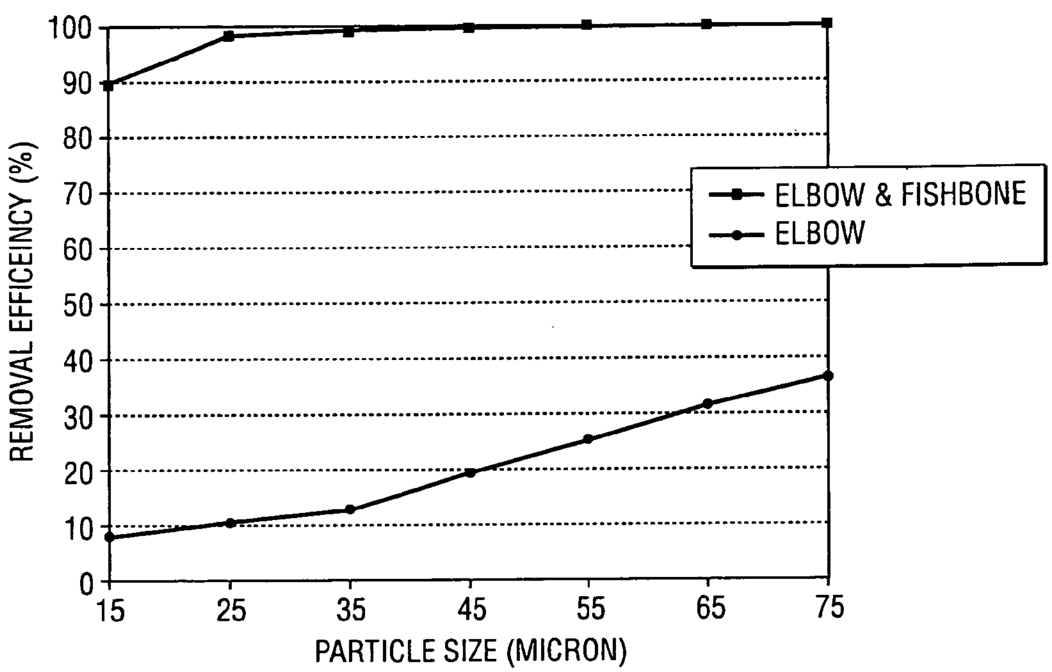
FIG. 7 illustrates separation efficiency of the subject invention separators as compared to a simple elbow separator, with varying particle size, assuming larger particles to be less dense.

In FIG. 7, the assumption is made that particle density decreases with increasing particle size, a phenomenon which actually occurs in real world processing, perhaps because larger particles are actually bubbles, have other than spherical shape, or contain gaseous voids. In this case, the efficiency of the simple elbow does not reach 40%, even with 75 μm particles, while the fishbone separator efficiency is virtually 100% down to 25 μm, and still 90% efficient at 15 μm, under the assumptions studied.

Figure 13:
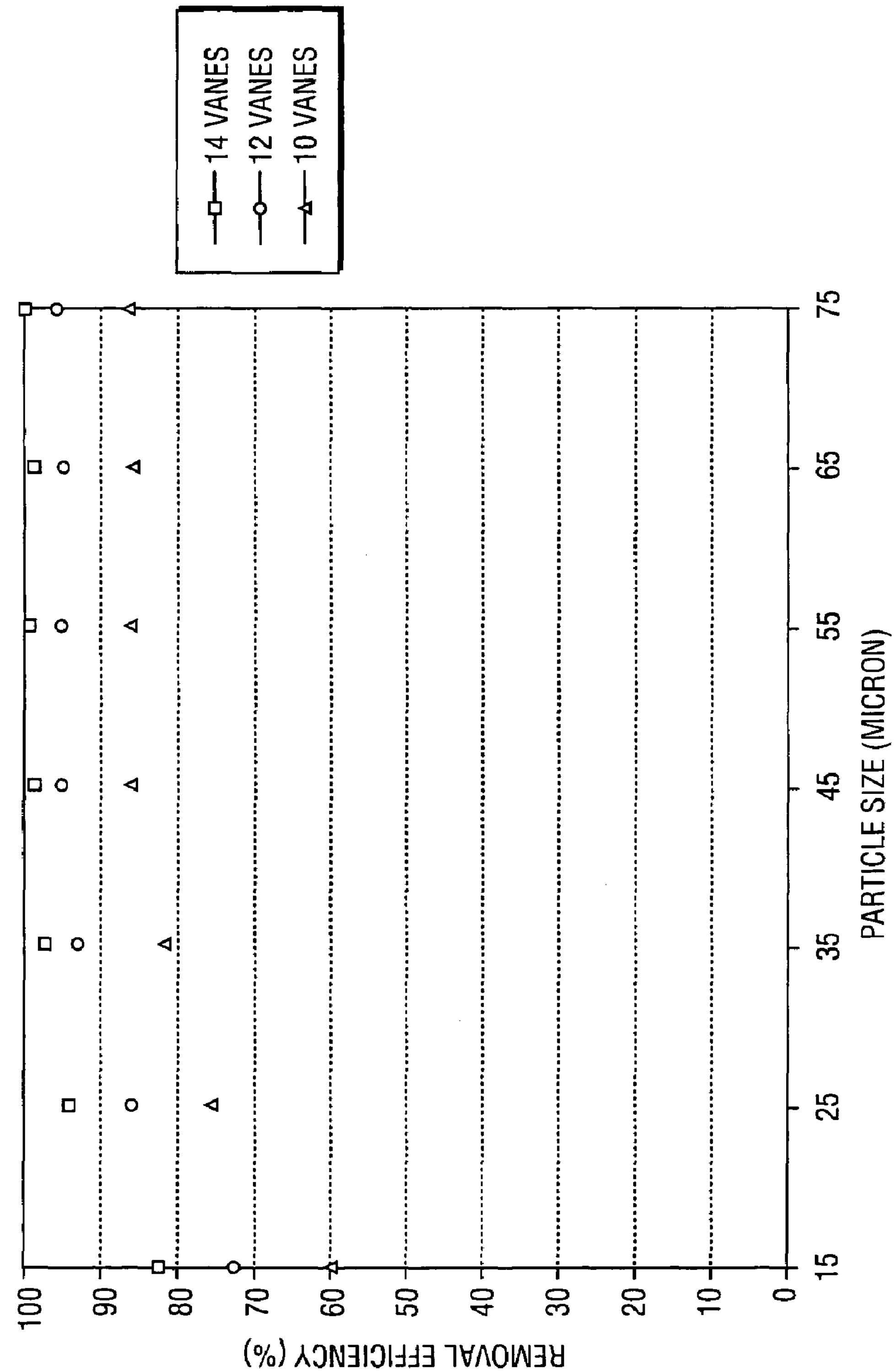
FIG. 13 illustrates removal efficiency as a function of the number of vanes.

FIG. 13 illustrates removal efficiency as it relates to the number of vanes employed, with particle density a function of diameter as described previously. The number of vanes was varied between 10 (5 pairs of 2) to 14, with the vane width being the same as the 16 vane (8 pairs of 2) model used to generate FIGS. 6 and 7. As can be seen, removal efficiency is high even with 10 vanes, but with 14 vanes can approach 100% efficiency. The optimum number of vanes can be easily calculated based on computational fluid dynamics, and can be verified in the field. Generally speaking, however, 5 to 10 vane pairs will suffice, with 6 to 10 vane pairs being preferred.

Figure 8:
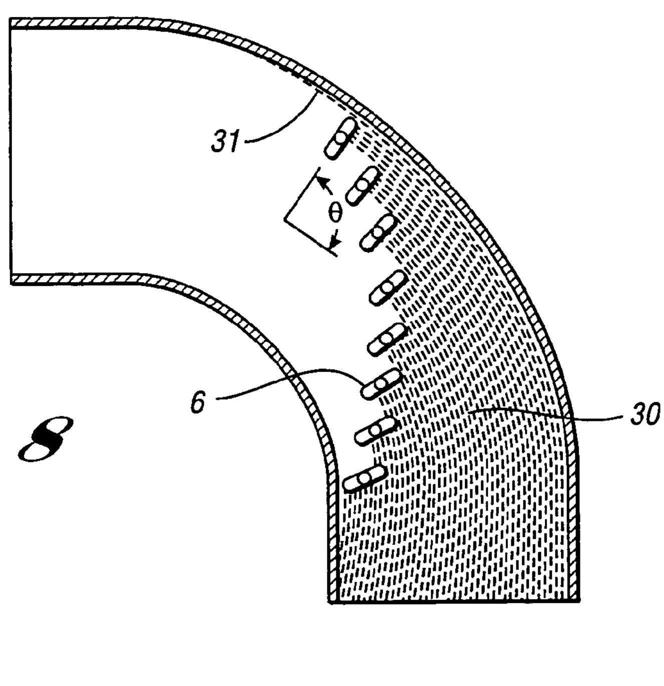
FIG. 8 schematically represents droplet separation in a separator of the present invention.

FIG. 8 illustrates schematically the droplet separation. The shaded area 36 represents gas containing liquid droplets. Only a very small "plume" 31 is not substantially freed of droplets upon passing by vanes 6. However, much of this plume will contact the elbow wall above the vanes, removing significant droplet content from this plume as well.

As can be seen, the subject invention separator is highly efficient, simple to construct, and most of all, exhibits a relatively small pressure drop. Thus overall process efficiency remains high. The additional pressure drop due to the fishbone impingement device is dependent on the density of the gas and the velocity of the gas in the elbow.

The subject invention separator requires at least one elbow, and at least one fishbone mounted therein, the fishbone having a plurality of vanes angled longitudinally downwards with respect to gravity, such that collected fluid may flow thereon and/or therein to one or more collection points. In the preferred embodiments, the collection points are portions of the elbow internal wall proximate the ends of the vanes of the fishbone. Although shown for a 90-degree elbow, the fishbone could be easily incorporated into elbows of different angles such as 45-degrees.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A gas-liquid inertial separator, comprising a) an elbow having an internal wall;

b) a fishbone separation enhancer, comprising b)i) a plurality of longitudinally extending vanes positioned across the direction of gas flow and spaced apart along the direction of gas flow; and b)ii) a central spine to which said vanes are attached, wherein the vanes are oriented downwards in their longitudinal direction with respect to gravity such that liquid collected from liquid-containing gas flowing through said elbow runs downwards to at least one collection site.

2. The separator of claim 1, wherein said vanes are of hollow construction and have at least one opening along a length thereof.

3. The separator of claim 2, wherein said opening is along the entire length of the vane, said vane positioned such that the opening faces the direction of flow of gas flowing through said elbow.

4. The separator of claim 1, wherein said vanes are mounted on struts which extend from said spine, or from said elbow.

5. The separator of claim 1, wherein said vanes have a cross-section having a height greater than a thickness, said vanes mounted such that an axis through the height of the cross-section is angled from the direction of gas flow by from 20° to about 90°.

6. The separator of claim 5, wherein said vanes are hollow and have an opening along a length thereof, said opening facing the direction of gas flow, the opening located such that the hollow vane has a fluid collecting lip located at the bottom thereof.

7. The separator of claim 1, wherein a spine is present, and said vanes slope downward from said spine and terminate proximate an internal wall of said elbow.

8. The separator of claim 1, wherein a spine is present, said vanes slope downward towards said spine, said spine is hollow to provide a downward fluid flow path, and holes in said spine communicate with said vanes to provide a path for fluid collected by said vanes to enter said spine.

9. The separator of claim 1, wherein said vanes are mounted on struts and are hollow, have an opening along the length thereof, and are slidably attachable over said strut.

10. The separator of claim 1 wherein said spine is a metal spine having a width of about one half or less of the internal diameter of said elbow.

11. The separator of claim 1, wherein said spine is oriented vertically in said elbow when the inlet to the elbow is in a horizontal plane.

12. The separator of claim 1, wherein said elbow has a circular cross section.

13. The separator of claim 1, wherein said elbow has a polygonal cross section.

14. The separator of claim 1, said separator having a spine, said spine floatingly positioned within said elbow.

15. The separator of claim 1, wherein a bottom end of said spine is located within said elbow by a first retainer fixed to a wall of said elbow, and wherein a top portion of said spine is located within said elbow by a link moveably connected to an upper retainer fixed to a wall of said elbow and moveably connected to said top portion of said spine.

16. The separator of claim 15, wherein said link is a unitary link rotatably connected to said upper retainer and rotatably connected to said top portion of said spine.

17. A process for the separation of droplets of liquid from a flowing gas stream, comprising directing said gas stream into a separator of claim 1, collecting liquid by contact of said droplets with said fishbone separation enhancer and walls of said elbow, and providing an exit gas stream which is depleted of liquid droplets.

18. The process of claim 17, wherein an inlet end of said elbow is in fluid communication with a process vessel which emanates a stream of liquid droplet-containing gas into said elbow, and collected liquid is directed back into said vessel from said separator.

19. The process of claim 17, wherein said vessel is a polymerization reactor, and said liquid droplets comprise at least one of liquid monomers or oligomers.

20. A gas-liquid inertial separator, comprising a) an enclosed elbow having an internal wall;

b) a fishbone separation enhancer, comprising b)i) a plurality of longitudinally extending vanes positioned across the direction of gas flow and spaced apart along the direction of gas flow; and b)ii) said vanes being attached to a central spine or to said internal wall of the enclosed elbow, wherein the vanes are oriented downwards in their longitudinal direction with respect to gravity such that liquid collected from liquid-containing gas flowing through said elbow runs downwards to at least one collection site.

21. The separator of claim 20, wherein said vanes are of hollow construction and have at least one opening along a length thereof.

22. The separator of claim 21, wherein said opening is along the entire length of the vane, said vane positioned such that the opening faces the direction of flow of gas flowing through said elbow.

23. The separator of claim 20, wherein a spine is present and said vanes are mounted on struts which extend from said spine, or from said elbow.

24. The separator of claim 20, wherein said vanes have a cross-section having a height greater than a thickness, said vanes mounted such that an axis through the height of the cross-section is angled from the direction of gas flow by from 20° to about 90°.

25. The separator of claim 24, wherein said vanes are hollow and have an opening along a length thereof, said opening facing the direction of gas flow, the opening located such that the hollow vane has a fluid collecting lip located at the bottom thereof.

26. The separator of claim 20, wherein a spine is present, and said vanes slope downward from said spine and terminate proximate an internal wall of said elbow.

27. The separator of claim 20, wherein a spine is present, said vanes slope downward towards said spine, said spine is hollow to provide a downward fluid flow path, and holes in said spine communicate with said vanes to provide a path for fluid collected by said vanes to enter said spine.

28. The separator of claim 20, wherein said vanes are mounted on struts and are hollow, have an opening along the length thereof, and are slidably attachable over said strut.

29. The separator of claim 20 wherein a spine is present and said spine is a metal spine having a width of about one half or less of the internal diameter of said elbow.

30. The separator of claim 20, wherein a spine is present and said spine is oriented vertically in said elbow when the inlet to the elbow is in a horizontal plane.

31. The separator of claim 20, wherein said elbow has a circular cross section.

32. The elbow of claim 20, wherein said elbow has a polygonal cross section.

33. The elbow of claim 20, wherein no spine is present, and wherein said vanes are each fixed to at least one interior wall of said elbow.

34. The separator of claim 20, said separator having a spine, said spine floatingly positioned within said elbow.

35. The separator of claim 20, wherein a spine is present having a bottom end of said spine is located within said elbow by a first retainer fixed to a wall of said elbow, and wherein a top portion of said spine is located within said elbow by a link moveably connected to an upper retainer fixed to a wall of said elbow and moveably connected to said top portion of said spine.

36. The separator of claim 35, wherein said link is a unitary link rotatably connected to said upper retainer and rotatably connected to said top portion of said spine.

37. A process for the separation of droplets of liquid from a flowing gas stream, comprising directing said gas stream into a separator of claim 20, collecting liquid by contact of said droplets with said fishbone separation enhancer and walls of said elbow, and providing an exit gas stream which is depleted of liquid droplets.

38. The process of claim 37, wherein an inlet end of said elbow is in fluid communication with a process vessel which emanates a stream of liquid droplet-containing gas into said elbow, and collected liquid is directed back into said vessel from said separator.

39. A process for the separation of droplets of liquid from a flowing gas stream, comprising directing the flowing gas stream into a pipe elbow containing a plurality of longitudinally extending vanes directed angularly downwards with respect to gravity positioned across the direction of gas flow and spaced apart along the direction of gas flow having fluid collection lips located at the bottom of the vanes and collecting liquid by contacting said droplets with the vanes.

40. The process of claim 39, wherein said elbow is in fluid communication with a polymerization reactor.

41. The process of claim 40, wherein said liquid droplets comprise at least one liquid monomer or oligomer.

42. The process of claim 39, wherein the elbow has an inlet in fluid communication with a process vessel which emanates a stream of liquid droplet containing gas into said elbow, and collected liquid is directed back into said vessel from said separator.

43. The process of claim 42, wherein said vessel is a polymerization reactor, and said liquid droplets comprise at least one of liquid monomers or oligomers.

* * * * *